US012127318B1

(12) United States Patent

Xu et al.

(10) Patent No.: US 12,127,318 B1
(45) Date of Patent: Oct. 22, 2024

(54) LED LAMP

(71) Applicant: SHENZHEN SNC OPTO ELECTRONIC CO., LTD., Guangdong (CN)

(72) Inventors: Jianyong Xu, Guangdong (CN); Yuqiang Zhong, Guangdong (CN)

(73) Assignee: SHENZHEN SNC OPTO ELECTRONIC CO., LTD., Shenzhen (CN)

( * ) Notice: Subject to any disclaimer, the term of this patent is extended or adjusted under 35 U.S.C. 154(b) by 0 days.

(21) Appl. No.: 18/641,308

(22) Filed: Apr. 19, 2024

(30) Foreign Application Priority Data

Dec. 26, 2023 (CN) ........................ 202323549677.4

(51) Int. Cl.
*H05B 47/155* (2020.01)
*F21V 31/00* (2006.01)
*F21V 5/04* (2006.01)
*F21Y 115/10* (2016.01)

(52) U.S. Cl.
CPC ......... *H05B 47/155* (2020.01); *F21V 31/005* (2013.01); *F21V 5/043* (2013.01); *F21Y 2115/10* (2016.08)

(58) Field of Classification Search
CPC ...... F21V 5/043; F21V 31/005; H05B 47/155
See application file for complete search history.

(56) References Cited

U.S. PATENT DOCUMENTS 8,434,893 B2 * 5/2013 Boyer ........................ F21V 7/18 362/240
10,228,103 B1 * 3/2019 Zhou .......................... F21L 4/08
11,231,161 B1 * 1/2022 Jiang .......................... F21V 7/10
2008/0002399 A1 * 1/2008 Villard .................. F21V 17/107 362/184
2015/0253488 A1 * 9/2015 Wilcox .................. G02B 6/305 362/619
2023/0184418 A1 * 6/2023 He .......................... F21V 17/12 362/249.02
2024/0080953 A1 * 3/2024 Broekman ........... H05B 47/155
2024/0111204 A1 * 4/2024 Okahisa ................ F21V 3/0625

* cited by examiner

*Primary Examiner* — Christopher E Dunay

(57) ABSTRACT

An LED lamp includes a heat dissipation lamp holder including a lamp panel mounting portion and a power supply mounting portion that are opposite to each other, the lamp panel mounting portion being provided with a mounting groove; a LED lamp panel fixedly mounted in the mounting groove and including a plurality of light emitting elements; a driving power supply mounted to the power supply mounting portion and configured to power the LED lamp panel; a light transmitting panel covering the LED lamp panel; and a first angle controller provided on the power supply mounting portion and electrically connected to the LED lamp panel, the first angle controller being configured to control the light emitting elements corresponding different positions of the light transmitting panel to emit light.

11 Claims, 8 Drawing Sheets

LED LAMP

CROSS-REFERENCE TO RELATED APPLICATIONS

This application claims priority of Chinese Utility Model application No. 2023235496774, filed on Dec. 26, 2023, entitled "LED LAMP", the entire content of which is incorporated herein in its entirety.

TECHNICAL FIELD

The present disclosure relates to lighting devices, and in particular to an LED lamp.

BACKGROUND

LED lamps have many advantages such as energy saving, environmental protection, long life, and have been widely used in various lighting places. The existing LED lamp is generally provided with a lens panel, but a position of the lens panel of the existing LED lamp is fixed, and the position of the lens panel cannot be flexibly adjusted according to requirements of different use places, so that a light distribution direction of the LED lamp cannot be adjusted. Therefore, it is necessary to improve a structure of the LED lamp.

SUMMARY

According to various embodiments, an LED lamp capable of adjusting a light emitting angle is provided.

An LED lamp includes a heat dissipation lamp holder including a lamp panel mounting portion and a power supply mounting portion that are opposite to each other, the lamp panel mounting portion being provided with a mounting groove; a LED lamp panel fixedly mounted in the mounting groove and including a plurality of light emitting elements; a driving power supply mounted to the power supply mounting portion and configured to power the LED lamp panel; a light transmitting panel covering the LED lamp panel; and a first angle controller provided on the power supply mounting portion and electrically connected to the LED lamp panel, the first angle controller being configured to control the light emitting elements corresponding different positions of the light transmitting panel to emit light.

In one of the embodiments, the LED lamp panel includes at least two groups of light emitting elements arranged in a matrix.

In one of the embodiments, a distance between adjacent two groups of the light emitting elements is 15 mm to 25 mm.

In one of the embodiments, each group of the light-emitting elements includes a first lamp bead, a second lamp bead, and a third lamp bead that are sequentially arranged, a distance between the second lamp bead and the first lamp bead or a distance between the second lamp bead the third lamp bead is 0.1 mm to 1 mm.

In one of the embodiments, the first angle controller includes a first switch base, a first electronic switch, and a first toggle, the first switch base is fixed to the power supply mounting portion, the first electronic switch is fixedly mounted on the first switch base, both ends of the first electronic switch are electrically connected to the driving power supply and the LED lamp panel, respectively, the first toggle is connected to the first electronic switch and is configured to be operated to switch a state of the first electronic switch, and the first electronic switch is configured to control the first lamp bead, the second lamp bead, and the third lamp bead to emit light or not according to different states.

In one of the embodiments, when the first electronic switch is in a first state, the first lamp bead and the second lamp bead emit light, and the third lamp bead does not emit light; when the first electronic switch is in a second state, the second lamp bead and the third lamp bead emit light, and the first lamp bead does not emit light; when the first electronic switch is in a third state, the first lamp bead, the second lamp bead, and the third lamp bead emit light.

In one of the embodiments, the LED lamp further includes a second angle controller, the second angle controller includes a second switch base, a second electronic switch, and a second toggle, the second switch base is fixed to the power supply mounting portion, the second electronic switch is fixedly mounted on the second switch base, and both ends of the second electronic switch are electrically connected to the driving power supply and the LED lamp panel, respectively, the second toggle is connected to the electronic switch and is configured to be operated to switch a state of the second electronic switch, the second electronic switch is configured to control the first lamp bead, the second lamp bead, and the third lamp bead emit light or not according to different states.

In one of the embodiments, when the second electronic switch is in a first state, the first lamp bead emit light, and the second lamp bead and the third lamp bead do not emit light; when the second electronic switch is in a second state, the second lamp bead emits light, and the first lamp bead and the third lamp bead do not emit light; when the second electronic switch is in a third state, the third lamp bead emits light, and the first lamp bead and the second lamp bead do not emit light.

In one of the embodiments, the light transmitting panel is a lens panel including a lens frame body and a plurality of convex lenses provided on the lens frame body, the plurality of convex lenses are in one-to-one correspondence with the plurality of light emitting elements, and each convex lens is convex in a direction away from the light emitting element, and the lens frame body is provided with a plurality of through holes corresponding to the plurality of convex lenses.

In one of the embodiments, the LED lamp further includes a first sealing ring provided between the light transmitting panel and the LED lamp panel.

In one of the embodiments, the power supply mounting portion includes a power supply accommodating cavity and a power supply cover plate, the driving power supply is mounted in the power accommodating cavity, the power supply cover plate covers the power accommodating cavity, one end of the power supply cover plate is hinged to the heat dissipation lamp holder, and another end of the power supply cover plate is detachably connected to the heat dissipation lamp holder through screws.

In one of the embodiments, the LED lamp further includes a color temperature power controller provided on the power supply mounting portion; a second sealing ring provided between the power supply mounting portion and the power supply cover plate; and a mounting bracket connected to the power supply mounting portion These and other objects, advantages, purposes and features will become apparent upon review of the following specification in conjunction with the drawings.

BRIEF DESCRIPTION OF THE DRAWINGS

The drawings are only for illustrative purposes and represent only schematic views rather than actual drawings, which cannot be understood as limitations of the present disclosure. In order to better illustrate the embodiments of the present disclosure, some components in the drawings may be omitted, enlarged or reduced, which does not represent the size of the actual product. For those skilled in the art, some well-known structures in the drawings and the descriptions thereof may be omitted.

REFERENCE SIGNS

Figure 1:
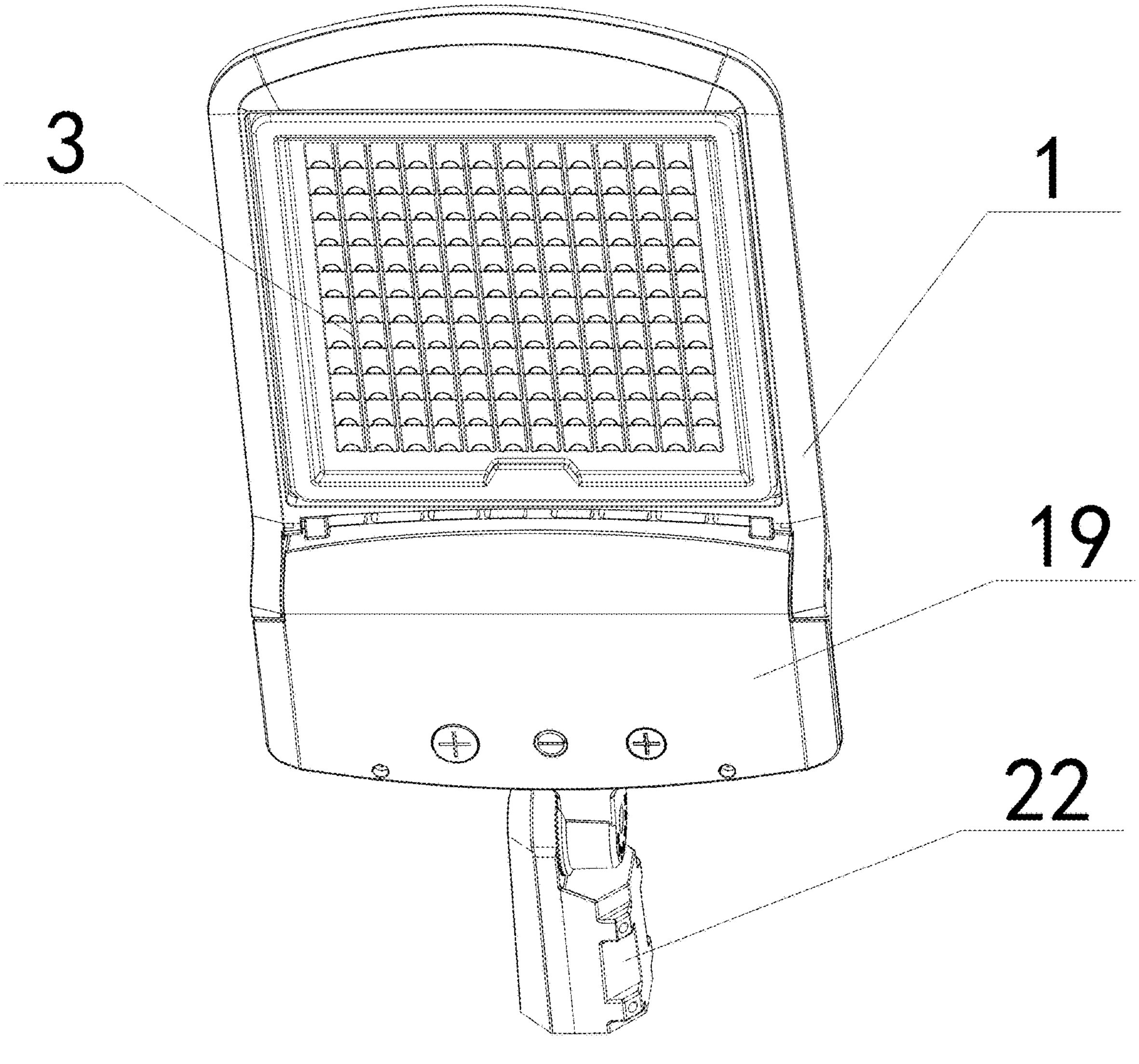
FIG. 1 is a perspective view of an LED lamp according to an embodiment.

1. Heat dissipation lamp holder; 2. LED lamp panel; 3. Light transmitting panel; 4. Driving power supply; 5. Mounting groove; 6. First angle controller; 7. Light emitting element; 8. First lamp bead; 9. Second lamp bead; 10. Third lamp bead; 11. Switch base; 12. Electronic switch; 13. Toggle; 14. lens frame body; 15. Lens; 16. Through hole; 17. First sealing ring; 18. Power supply accommodating cavity; 19. Power supply cover plate; 20. Color temperature power controller; 21. Second sealing ring; 22. Mounting bracket; 30. Lamp panel mounting portion; 40. Power supply mounting portion.

DETAILED DESCRIPTION OF THE EMBODIMENTS

The technical solution in the embodiment of the present application will be clearly and completely described below in conjunction with the drawings in the embodiment of the application. Apparently, the described embodiments are only some of the embodiments of the application, not all of them. Based on the embodiments in the present application, all other embodiments obtained by a person skilled in the art without making creative efforts shall all fall within the protection scope of the present application.

In the drawings of the embodiments of the present disclosure, the same or similar numbers correspond to the same or similar components. In the description of the present disclosure, it should be understood that terms "upper", "lower", "front" and "rear", "left", "right", "vertical", "horizontal", "lateral", "longitudinal", "top", "bottom", "inner", "outer", and other indicated orientation or positional relationships are based on the orientation or positional relationship shown in the drawings for convenience and simplicity of description of the present disclosure only, and not as an indication or implication that the devices or elements referred to must have or be constructed or operated in a specific orientation. Therefore, the terms describing positional relationships in the drawings are only for illustrative purposes and should not be construed as limitations of the present disclosure.

Figure 2:
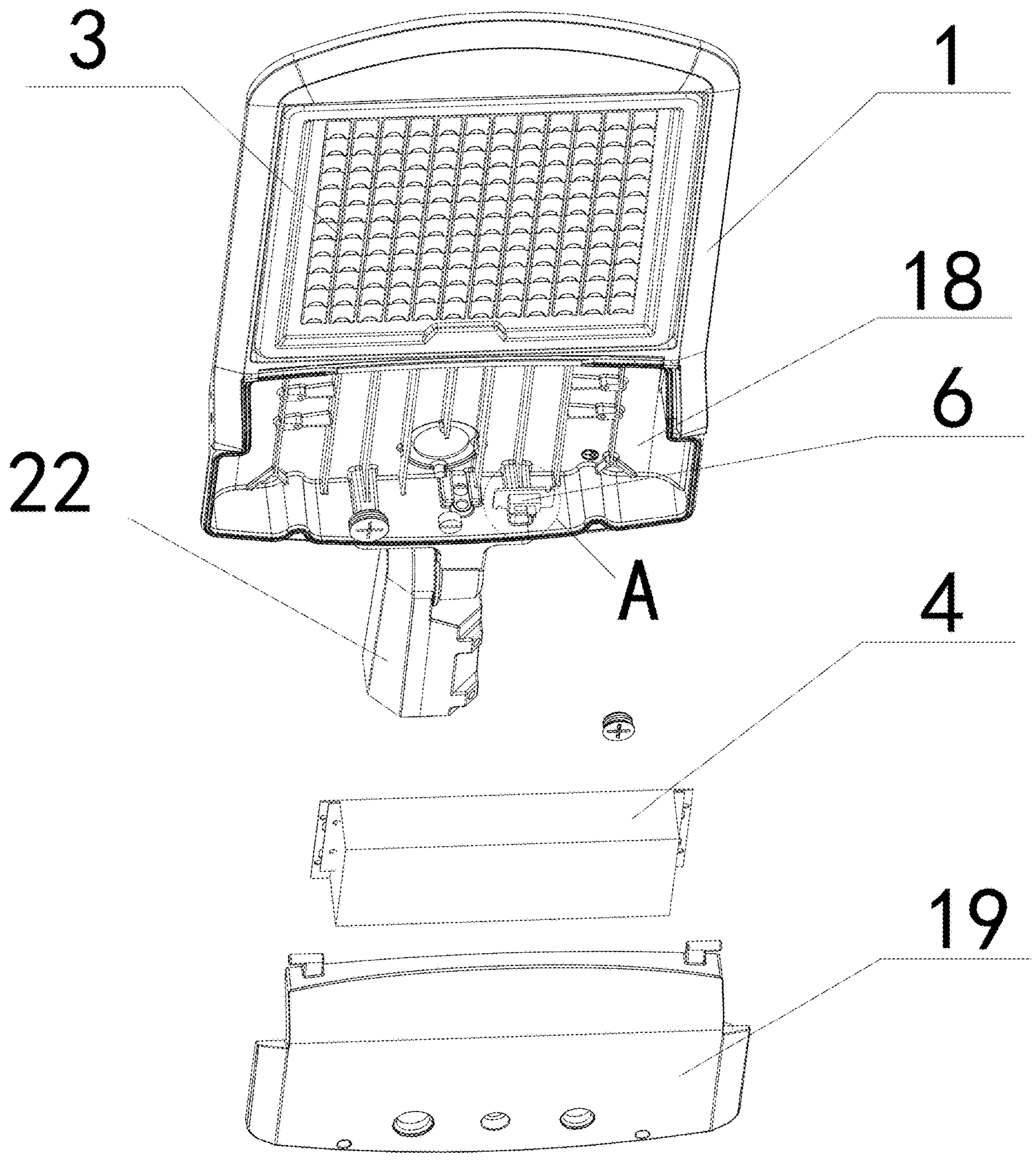
FIG. 2 is an exploded view of the LED lamp shown in FIG. 1.
Figure 3:
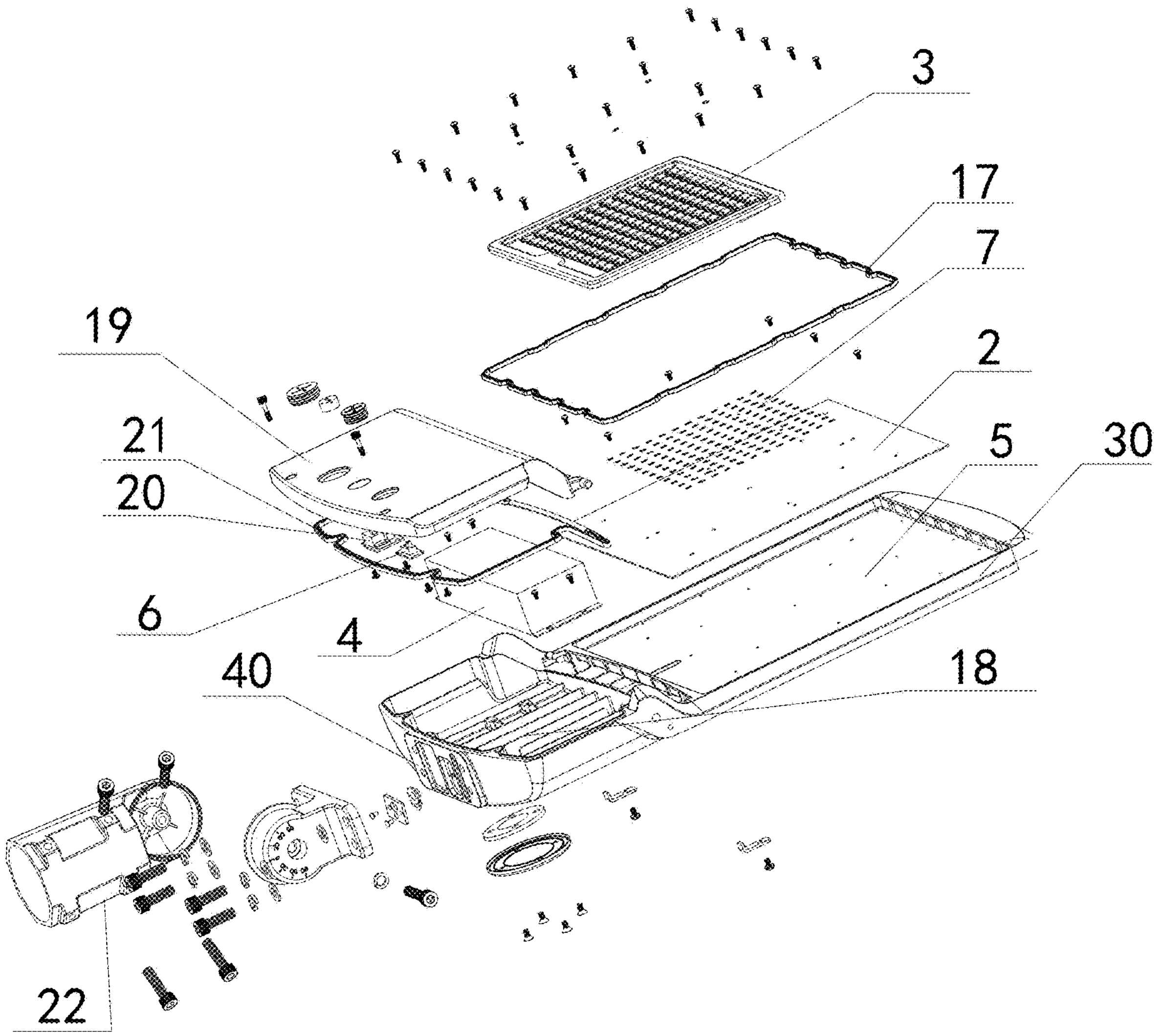
FIG. 3 is another exploded view of the LED lamp shown in FIG. 1.

Referring to FIGS. 1 to 3, an LED lamp according to an embodiment is provided, including a heat dissipation lamp holder 1, an LED lamp panel 2, a light transmitting panel 3, a driving power supply 4, and a first angle controller 6. The heat dissipation lamp holder 1 includes a lamp panel mounting portion 30 and a power supply mounting portion 40 that are opposite to each other. The driving power supply 4 is mounted to the power supply mounting portion configured to power the LED lamp panel 2. The lamp panel mounting portion 30 is provided with a mounting groove 5, and the LED lamp panel 2 is fixedly mounted in the mounting groove 5. The led lamp panel 2 includes a plurality of light emitting elements 7. The light transmitting panel 3 covers the LED lamp panel 2. The first angle controller 6 is provided on the power supply mounting portion 40 and is electrically connected to the LED lamp panel 2. The first angle controller 6 is configured to control the light emitting elements 7 corresponding different positions of the light transmitting panel 3 to emit light.

By providing the above-mentioned first angle controller 6, when a light emitting angle of the LED lamp needs to be adjusted, it is only necessary to operate the first angle controller 6 to control the light emitting elements 7 corresponding different positions of the light transmitting panel 3 to emit light.

Figure 5:
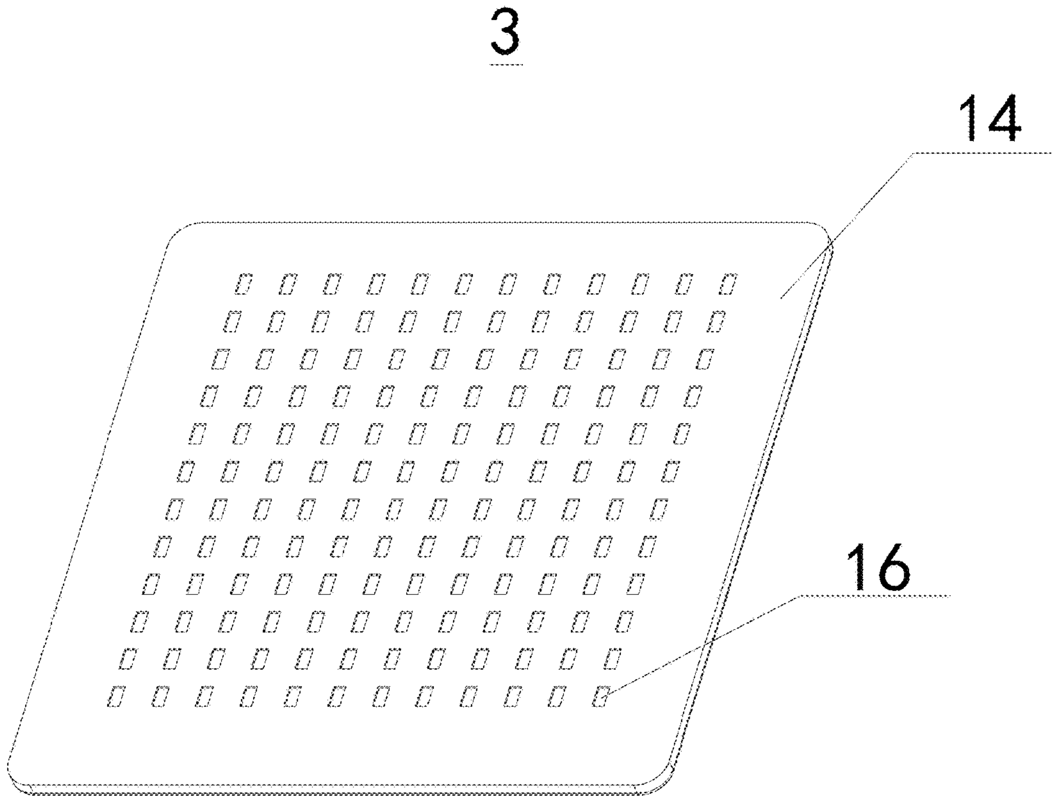
FIG. 5 is a perspective view of a light transmitting panel shown in FIG. 3.
Figure 6:
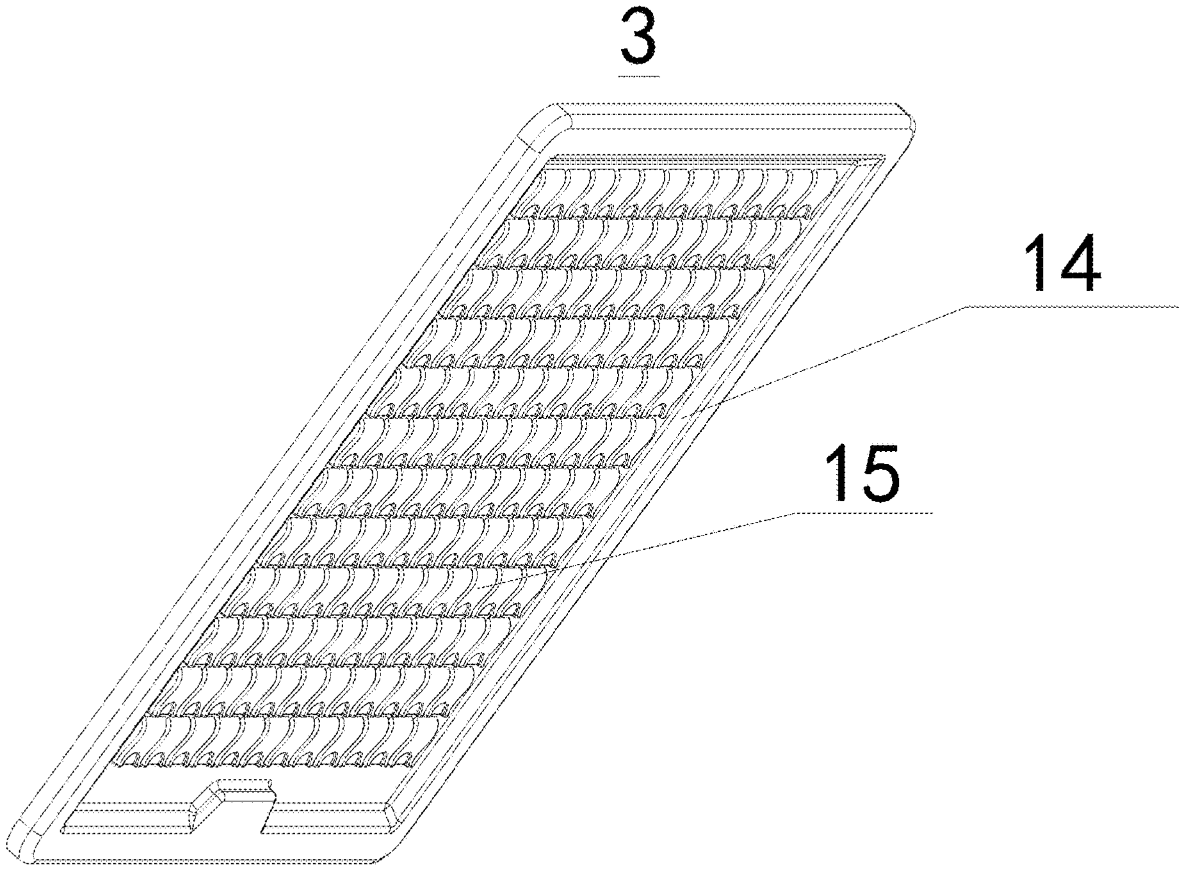
FIG. 6 is similar to FIG. 5, but viewed from another aspect.

Referring to FIGS. 5 and 6, the light transmitting panel 3 is a lens panel with a lens structure and is provided on the light emitting elements 7. The light transmitting panel 3 includes a lens frame body 14 and a plurality of convex lenses 15 provided on the lens frame body 14. The plurality of convex lenses 15 are in one-to-one correspondence with the plurality of light emitting elements 7, and each convex lens 15 is convex in a direction away from the light emitting element 7. The lens frame body 14 is provided with a plurality of through holes 16 corresponding to the plurality of convex lenses 15, so that light emitted from the light-emitting element 7 can emit to the lenses 15 through the through holes 16.

Figure 7:
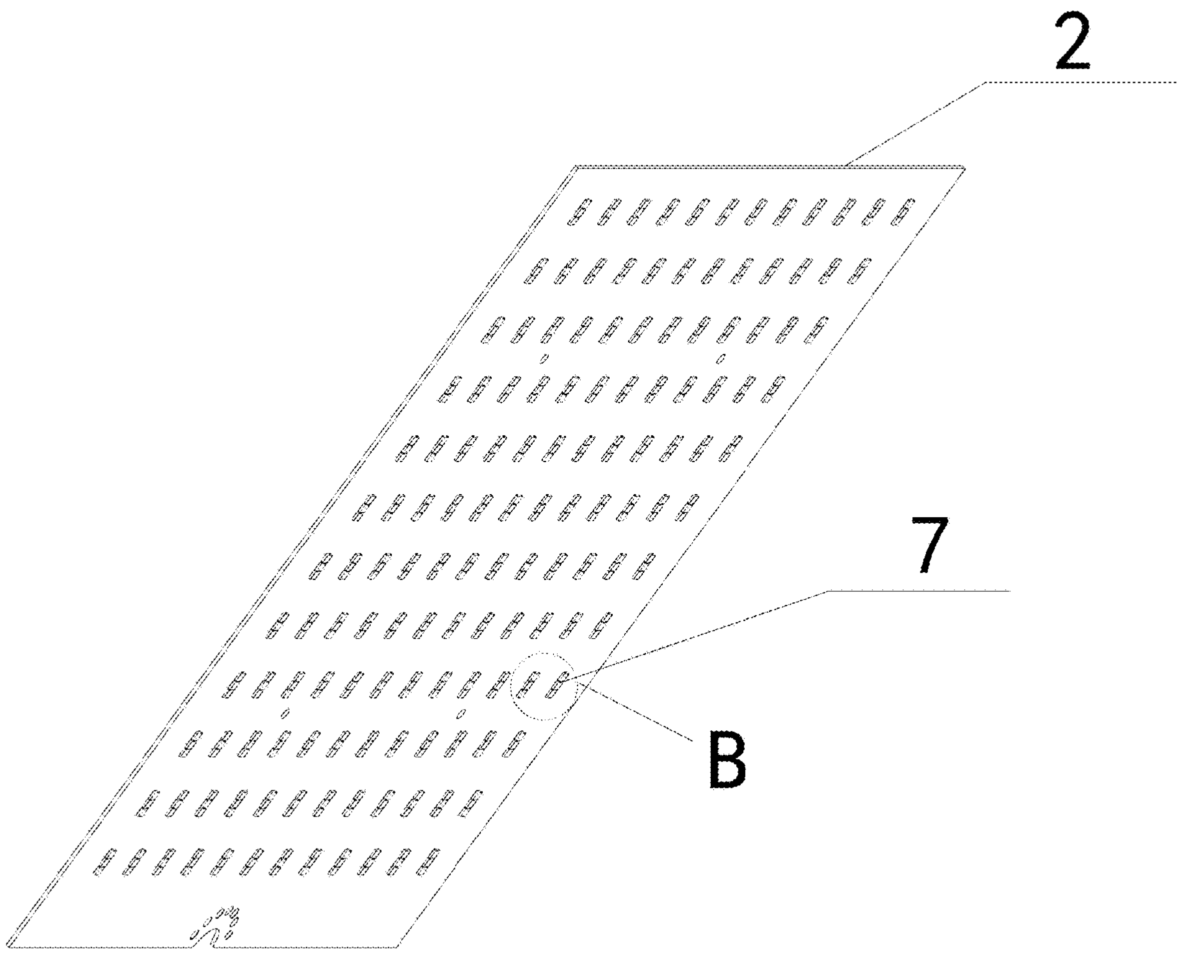
FIG. 7 is a perspective view of a LED lamp panel shown in FIG. 3.

Referring to FIG. 7, the LED lamp panel 2 includes at least two groups of light emitting elements 7 arranged in a matrix. A distance between adjacent two groups of the light emitting elements 7 may be 15 mm to 25 mm, so as to achieve a better light emitting effect.

Figure 8:
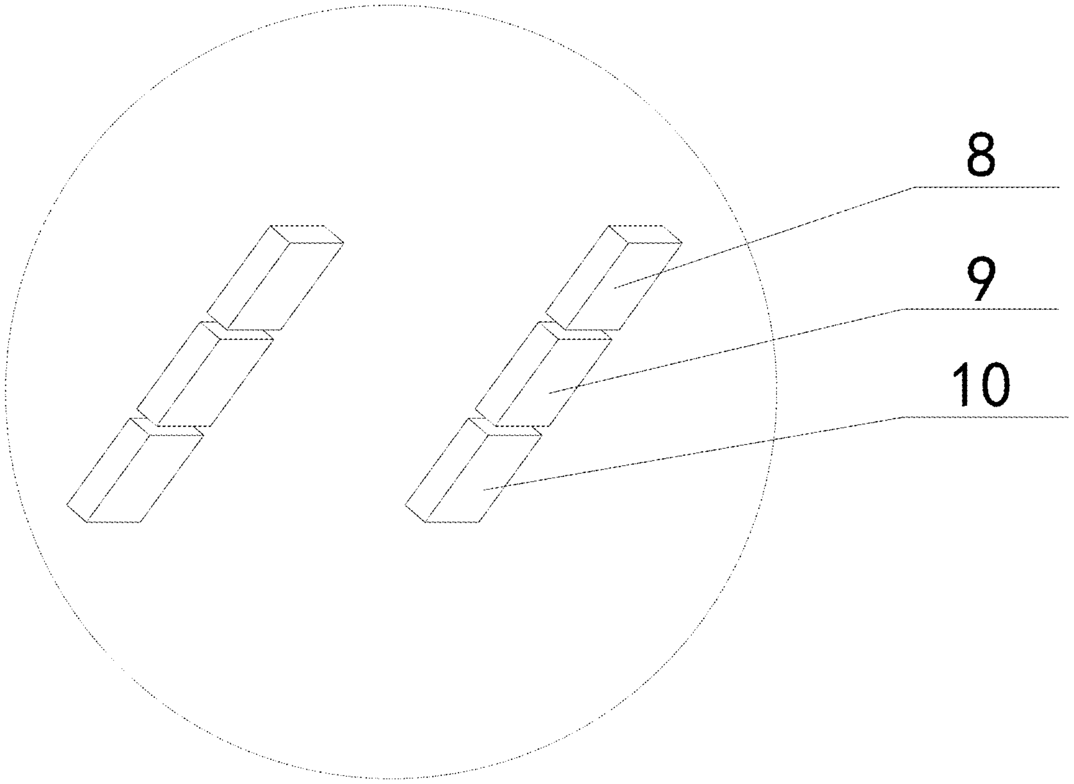
FIG. 8 is an enlarged view of portion B of FIG. 7.

Referring to FIG. 8, each group of the light emitting elements 7 includes a first lamp bead 8, a second lamp bead 9, and a third lamp bead 10 that are sequentially arranged. A distance between the second lamp bead 9 and the first lamp bead 8 or a distance between the second lamp bead 9 and the third lamp bead 10 may be 0.1 mm to 1 mm, for example 0.3 mm to 0.5 mm, so as to achieve a better light emitting effect.

Figure 4:
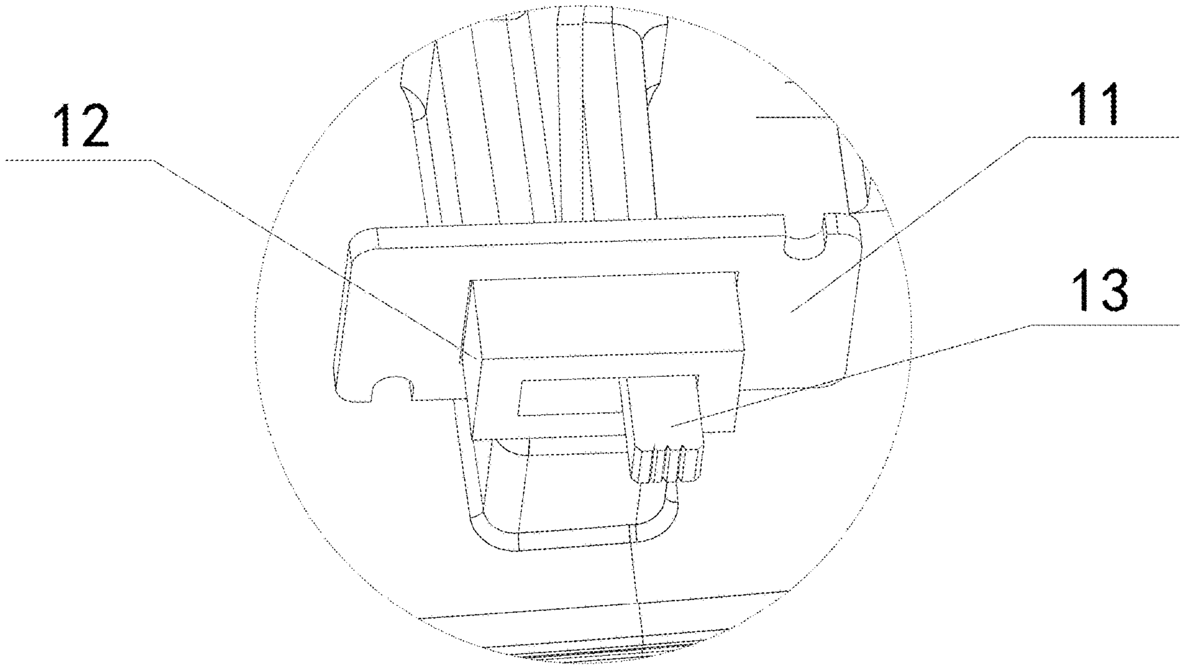
FIG. 4 is an enlarged view of portion A of FIG. 2.

Referring to FIG. 4, the first angle controller 6 includes a first switch base 11, a first electronic switch 12, and a first toggle 13. The first switch base 11 is fixed to the power supply mounting portion 40. The first electronic switch 12 is fixedly mounted on the first switch base 11, and both ends of the first electronic switch 12 are electrically connected to the driving power supply 4 and the LED lamp panel 2, respectively. The first toggle 13 is connected to the first electronic switch 12 and is configured to be operated to switch a state of the first electronic switch 12. The first electronic switch 12 is configured to control the first lamp bead 8, the second lamp bead 9, and the third lamp bead 10 to emit light or not according to different states.

When the first electronic switch 12 is in a first state, the first lamp bead 8 and the second lamp bead 9 emit light, and the third lamp bead 10 does not emit light.

When the first electronic switch 12 is in a second state, the second lamp bead 9 and the third lamp bead 10 emit light, and the first lamp bead 8 does not emit light.

When the first electronic switch 12 is in a third state, the first lamp bead 8, the second lamp bead 9, and the third lamp bead 10 emit light.

Figure 9:
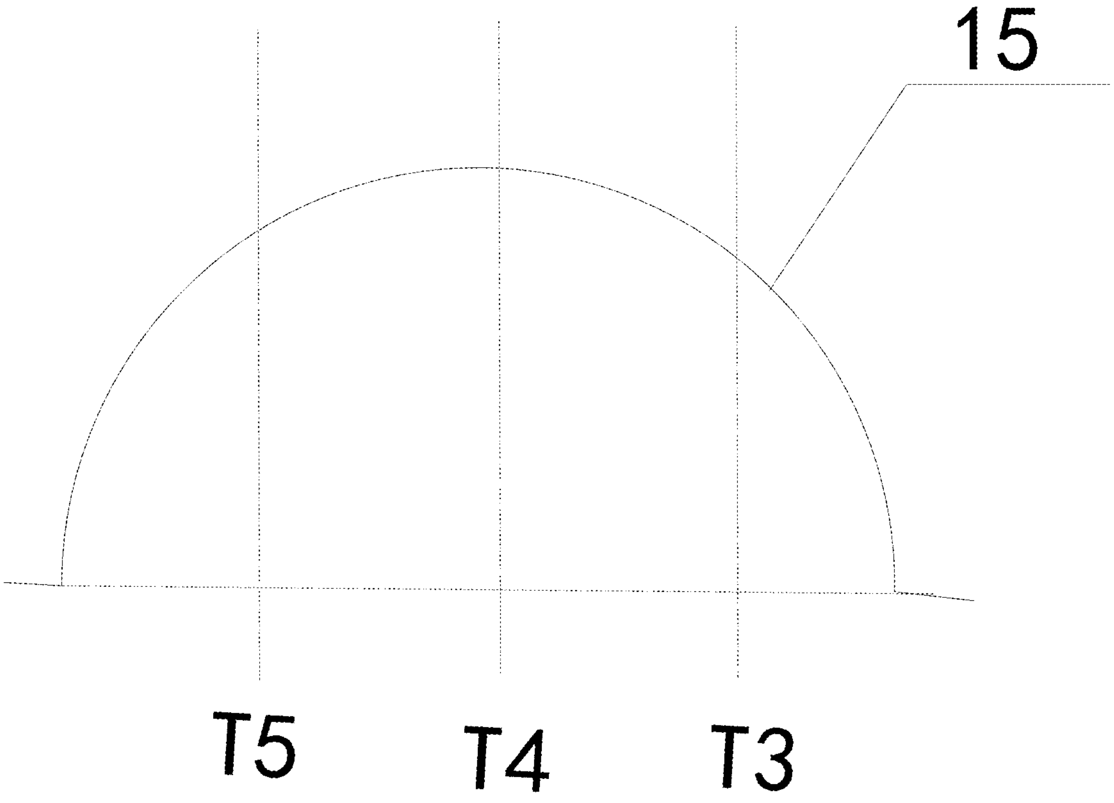
FIG. 9 is a schematic view of a lamp bead.

Referring to FIG. 9, the first lamp bead 8, the second lamp bead 9, and the third lamp bead 10 of the light emitting elements 7 are correspondingly provided at positions T3, T4, and T5 on the lens 15. When a light emitting angle of the light transmitting panel 3 needs to be adjusted, the first electronic switch 12 is controlled to be in the first state, the second state, or the third state to achieve a desired lighting effect by operating the first toggle 13. Specifically, when the first electronic switch 12 is in the first state by operating the first toggle 13, the first lamp bead 8 the position T3 and the second lamp bead 9 at the position T4 emit light, and the third lamp bead 10 at the position T5 does not emit light. When the first electronic switch 12 is in the second state by operating the first toggle 13, the second lamp bead 9 the position T4 and the third lamp bead 10 at the position T5 emit light, and the first lamp bead 8 at the position T3 does not emit light. When the first electronic switch 12 is in the third state by operating the first toggle 13, the first lamp bead 8 at the position T3, the second lamp bead 9 at the position T4, and the third lamp bead 10 at the position T5 emit light. In this way, it is only necessary to operate the first toggle 13 to control whether the lamp beads at different positions emit light or not to adjust a light emitting angle of the LED lamp without replacing the lens panel 3.

In one embodiment, the LED lamp further includes a second angle controller (not shown). A structure of the second angle controller is similar to that of the first angle controller, and the second angle controller includes a second switch base, a second electronic switch, and a second toggle. The second switch base is fixed to the power supply mounting portion. The second electronic switch is fixedly mounted on the second switch base, and both ends of the second electronic switch are electrically connected to the driving power supply 4 and the LED lamp panel 2, respectively. The second toggle is connected to the electronic switch and is configured to be operated to switch a state of the second electronic switch. The second electronic switch is configured to control whether the first lamp bead 8, the second lamp bead 9, and the third lamp bead 10 emit light or not according to different states.

When the second electronic switch is in a first state, the first lamp bead 8 emit light, and the second lamp bead 9 and the third lamp bead 10 do not emit light.

When the second electronic switch is in a second state, the second lamp bead 9 emits light, and the first lamp bead 8 and the third lamp bead 10 do not emit light.

When the second electronic switch is in a third state, the third lamp bead 10 emits light, and the first lamp bead 8 and the second lamp bead 9 do not emit light.

When the light emitting angle of the light transmitting panel 3 needs to be adjusted, the first electronic switch 12 is controlled to be in the first state, the second state, or the third state to achieve a desired lighting effect by operating the first toggle. Specifically, when the second electronic switch is in the first state by operating the second toggle, the first lamp bead 8 at the position T3 emits light, and the second lamp bead 9 at the position T4 and the third lamp bead 10 at the position T5 do not emit light. When the second electronic switch is in the second state by operating the second toggle, the second lamp bead 9 at the position T4 emits light, and the first lamp bead 8 at the position T3 and the third lamp bead 10 at the position T5 do not emit light. When the second electronic switch is in the third state by operating the second toggle, the first lamp bead 8 at the position T3, the second lamp bead 9 at the position T4, and the third lamp bead 10 at the position T5 do not emit light. In this way, it is only necessary to operate the first toggle 13 to control whether the lamp beads at different positions emit light or not to adjust the light emitting angle of the LED lamp without replacing the lens panel 3.

Referring to FIG. 3, the LED lamp further includes a first sealing ring 17 provided between the light transmitting panel 3 and the LED lamp panel 2, so that the LED lamp has good waterproof effect.

The power supply mounting portion 40 includes a power supply accommodating cavity 18 and a power supply cover plate 19. The driving power supply 4 is mounted in the power supply accommodating cavity 18. The power supply cover plate 19 covers the power supply accommodating cavity 18. One end of the power supply cover plate 19 is hinged to the heat dissipation lamp holder 1, and the other end of the power supply cover plate 19 is detachably connected to the heat dissipation lamp holder 1 through screws.

The LED lamp further includes a color temperature power controller 20 provided on the power supply mounting portion 40. The LED lamp further includes a second sealing ring 21 provided between the power supply mounting portion 40 and the power supply cover plate 19. LED lamp further includes a mounting bracket 22 connected to the power supply mounting portion 40.

According to the LED lamp, the effect of adjusting the light emitting angle of the LED lamp can be achieved through the first angle controller or/and the second angle controller without replacing the lens panel 3, so that the cost for replacing the lens panel 3 is saved, and the led lamp is safer and more reliable.

The above-mentioned embodiments do not constitute a limitation on the protection scope of the technical solution. Any modifications, equivalent replacements and improvements made within the spirit and principles of the above-mentioned embodiments shall be included within the protection scope of this technical solution.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall all fall within the protection scope of the present disclosure.

What is claimed is:

1. An LED lamp, comprising:

a heat dissipation lamp holder comprising a lamp panel mounting portion and a power supply mounting portion that are opposite to each other, the lamp panel mounting portion being provided with a mounting groove;

a LED lamp panel fixedly mounted in the mounting groove and comprising a plurality of light emitting elements;

a driving power supply mounted to the power supply mounting portion and configured to power the LED lamp panel;

a light transmitting panel covering the LED lamp panel; and a first angle controller provided on the power supply mounting portion and electrically connected to the LED lamp panel, the first angle controller being configured to control the light emitting elements corresponding different positions of the light transmitting panel to emit light;

wherein the first angle controller comprises a first switch base, a first electronic switch, and a first toggle, the first switch base is fixed to the power supply mounting portion, the first electronic switch is fixedly mounted on the first switch base, both ends of the first electronic switch are electrically connected to the driving power supply and the LED lamp panel, respectively, the first toggle is connected to the first electronic switch and is configured to be operated to switch a state of the first electronic switch, and the first electronic switch is configured to control the first lamp bead, the second lamp bead, and the third lamp bead to emit light or not according to different states.

2. The LED lamp according to claim 1, wherein the LED lamp panel comprises at least two groups of light emitting elements arranged in a matrix.

3. The LED lamp according to claim 2, wherein a distance between adjacent two groups of the light emitting elements is 15 mm to 25 mm.

4. The LED lamp according to claim 2, wherein each group of the light-emitting elements comprises a first lamp bead, a second lamp bead, and a third lamp bead that are sequentially arranged, a distance between the second lamp bead and the first lamp bead or a distance between the second lamp bead the third lamp bead is 0.1 mm to 1 mm.

5. The LED lamp according to claim 1, wherein when the first electronic switch is in a first state, the first lamp bead and the second lamp bead emit light, and the third lamp bead does not emit light;

when the first electronic switch is in a second state, the second lamp bead and the third lamp bead emit light, and the first lamp bead does not emit light;

when the first electronic switch is in a third state, the first lamp bead, the second lamp bead, and the third lamp bead emit light.

6. The LED lamp according to claim 1, further comprising a second angle controller, wherein the second angle controller comprises a second switch base, a second electronic switch, and a second toggle, the second switch base is fixed to the power supply mounting portion, the second electronic switch is fixedly mounted on the second switch base, and both ends of the second electronic switch are electrically connected to the driving power supply and the LED lamp panel, respectively, the second toggle is connected to the electronic switch and is configured to be operated to switch a state of the second electronic switch, the second electronic switch is configured to control the first lamp bead, the second lamp bead, and the third lamp bead emit light or not according to different states.

7. The LED lamp according to claim 6, wherein when the second electronic switch is in a first state, the first lamp bead emit light, and the second lamp bead and the third lamp bead do not emit light;

when the second electronic switch is in a second state, the second lamp bead emits light, and the first lamp bead and the third lamp bead do not emit light;

when the second electronic switch is in a third state, the third lamp bead emits light, and the first lamp bead and the second lamp bead do not emit light.

8. The LED lamp according to claim 1, wherein the light transmitting panel is a lens panel comprising a lens frame body and a plurality of convex lenses provided on the lens frame body, the plurality of convex lenses are in one-to-one correspondence with the plurality of light emitting elements, and each convex lens is convex in a direction away from the light emitting element, and the lens frame body is provided with a plurality of through holes corresponding to the plurality of convex lenses.

9. The LED lamp according to claim 1, further comprising a first sealing ring provided between the light transmitting panel and the LED lamp panel.

10. The LED lamp according to claim 1, wherein the power supply mounting portion comprises a power supply accommodating cavity and a power supply cover plate, the driving power supply is mounted in the power accommodating cavity, the power supply cover plate covers the power accommodating cavity, one end of the power supply cover plate is hinged to the heat dissipation lamp holder, and another end of the power supply cover plate is detachably connected to the heat dissipation lamp holder through screws.

11. The LED lamp according to claim 1, further comprising:

a color temperature power controller provided on the power supply mounting portion;

a second sealing ring provided between the power supply mounting portion and the power supply cover plate; and a mounting bracket connected to the power supply mounting portion.

* * * * *